United States Patent [19]
Cramer et al.

[11] Patent Number: 6,063,169
[45] Date of Patent: May 16, 2000

[54] CONTROL MEANS FOR MOLECULAR SIEVE ON-BOARD OXYGEN GENERATOR

[75] Inventors: Robert L. Cramer, Davenport; Donald P. Muhs, deceased, late of Davenport, both of Iowa, by Beverly Muhs, executrix

[73] Assignee: Litton Systems, Inc., Woodland Hills, Calif.

[21] Appl. No.: 08/644,134

[22] Filed: May 10, 1996

[51] Int. Cl.$^7$ .................................................. B01D 53/04
[52] U.S. Cl. .................................. 96/112; 95/15; 95/21; 96/114; 96/130; 137/625.43
[58] Field of Search ............................. 96/112–114, 121, 96/124, 130; 95/14, 15, 19, 21, 96, 95, 100, 902; 137/613, 625.29, 625.43

[56] References Cited

U.S. PATENT DOCUMENTS

| | | | |
|---|---|---|---|
| 3,894,561 | 7/1975 | Thornbery | 137/625.29 |
| 3,948,286 | 4/1976 | Dunbar et al. | 137/613 X |
| 4,318,425 | 3/1982 | Marks | 137/625.43 |
| 4,567,909 | 2/1986 | Schebler et al. | 137/81.1 |
| 4,747,853 | 5/1988 | Haslett et al. | 96/131 X |
| 4,802,899 | 2/1989 | Vrana et al. | 96/130 X |
| 4,877,429 | 10/1989 | Hunter | 95/95 |
| 4,927,434 | 5/1990 | Cordes et al. | 96/113 X |
| 4,966,194 | 10/1990 | Nakatsukasa et al. | 137/625.43 |
| 5,074,893 | 12/1991 | Hursey | 96/113 X |
| 5,137,549 | 8/1992 | Stanford et al. | 96/113 X |

FOREIGN PATENT DOCUMENTS

| | | | |
|---|---|---|---|
| 250235 | 12/1987 | European Pat. Off. | 96/114 X |

*Primary Examiner*—Richard L. Chiesa
*Attorney, Agent, or Firm*—Lowe Hauptman Gopstein & Berner

[57] ABSTRACT

A control device for molecular sieve on-board oxygen generating systems measures both temperature and pressure of the inlet air of an oxygen generating system. An electronic control unit applies pressure limits to a pressure measurement signal and combines it with a temperature measurement signal to produce a composite analog signal responsive to both temperature and pressure inlet air conditions. This analog signal is linearly converted to a frequency signal, whereupon the frequency signal is divided by a constant in order to produce a drive signal for control of the absorb/vent bed cycle valves. Composition control is achieved by venting product mixture as required. Inlet air pressures down to 5 PSIG (pounds per square inch gauge) produce correct system operation, and the quantity of conditioned air required is automatically limited so that system efficiency is higher than prior art systems.

21 Claims, 8 Drawing Sheets

CONTROL MEANS FOR MOLECULAR SIEVE ON-BOARD OXYGEN GENERATOR

CROSS REFERENCE TO RELATED APPLICATIONS

The subject matter of the present application is related to U.S. patent application Ser. No. 08/621,166 filed Mar. 22, 1996, now abandoned, titled "VALVE FOR GAS FLOW CONTROL", assigned to the assignee hereof and herein incorporated by reference.

BACKGROUND OF THE INVENTION

The present invention relates generally to an improved control means for use in systems which separate gas mixtures by pressure swing molecular sieve absorption techniques, and more specifically to the improved control means as applied to oxygen generating systems for oxygen enrichment and control.

The need for oxygen enrichment and/or oxygen composition control has been well documented in the prior art in diverse areas such as providing proper aircrew breathing mixtures in varying altitudes and providing specially constituted breathing mixtures for individuals undergoing medical treatment. The systems used to supply such special requirements commonly utilize an apparatus which employs absorptive materials designed to absorb and retain particular gas types, such as nitrogen. The most common system process is the pressure swing absorption technique.

A typical prior art pressure swing absorption system apparatus 110 is shown in FIG. 1. Inlet Air Supply 111 is applied to Pressure Regulator 112. Pressure Regulator Output 113, which is of limited pressure variation, is applied to First Input Valve 115 and Second Input Valve 120 as shown. First Absorber Bed Input 116 is supplied through First Input Valve 115. When First Input Valve 115 is open, First Vent Valve 125 is closed. With First Input Valve 115 open, air is routed through First Absorber Bed 140 where absorption of undesired gaseous components occurs because of the characteristics of the absorbing materials used in First Absorber Bed 140. After this processing, the output of First Absorber Bed 140 is routed through First Check Valve 150, which when open connects Outlet Gas Mixture 160 to the output of First Absorber Bed 140. Alternatively, when First Input Valve 115 is closed, First Vent Valve 125 is open which connects the air content of First Absorber Bed 140 to Vent 135 so that undesired trapped gaseous components are discharged from First Absorber Bed 140 to Vent 135. This desorption process is further enhanced by a controlled purge flow through Fixed Cross Flow Orifice 151. During this process First Check Valve 150 is closed. After venting of First Absorber Bed 140, the states of First Input Valve 115, First Vent Valve 125 and First Check Valve 150 are reversed and the absorption process will again occur. The cycle of absorb/vent repeats continuously during system operation.

The second half of the system, composed of Second Input Valve 120, Second Vent Valve 130, Second Absorber Bed 145 and Second Check Valve 155 operates in like manner but concurrently with the first half of the system. Second Absorber Bed Input 121 is supplied through Second Input Valve 120. When First Absorber Bed 140 is providing enriched gas mixture to Outlet Gas Mixture 160, Second Absorber Bed 145 is connected to Vent 135; and when First Absorber Bed 140 is connected to Vent 135 Second Absorber Bed 145 is providing enriched gas mixture to Outlet Gas Mixture 160. First Check Valve 150 and Second Check Valve 155 ensure that only the enriched gas mixture is routed to Outlet Gas Mixture 160 and that the venting process does not affect Outlet Gas Mixture 160.

The typical prior art pressure swing absorption system described above has been utilized as the basis for various improvement patents. U.S. Pat. Nos. 3,948,286 and 4,877,429 present improved valve devices for application in this system. U.S. Pat. No. 4,802,899 presents a way of physically arranging apparatus components to achieve system service and maintenance advantages. U.S. Pat. No. 4,567,909 describes a method of using gas flow control across the absorptive beds as a means of controlling the oxygen concentration of the final product gas. Prior art systems do not address two inherent problems encountered in applying on-board oxygen concentration systems to aircraft, which are operated from air sources of limited capacity and limited pressure, and of the dependence of overall system efficiency on the amount of conditioned air consumed during OBOGS operation which represents a power inefficiency that results in reduced aircraft performance.

The first problem not addressed in the prior art, that of operation from air sources of limited capacity and pressure, manifests itself in aircraft applications by the requirement that an effective OBOGS provide proper operation from 8 to 250 pounds per square inch gauge (PSIG) air inlet pressure, whereas prior art systems exhibit significant performance degradation with air inlet pressures below approximately 20 PSIG. PSIG, as is well known in the art, is the pounds per square inch above atmospheric pressure which is approximately 14.7 at sea level. The second problem not addressed in the prior art is the strong need for efficiency in all aircraft systems, and in particular the need for efficient OBOGS operation at critical points in the aircraft performance envelope. For example, any OBOGS inefficiency represents a loss of available engine power which in turn may manifest itself as inefficient fuel utilization or some other deficiency, such as adverse effects on the cooling or heat exchanger design.

There is thus an unmet need in the art to be able to utilize an OBOGS in airborne applications which is efficient and which will operate from limited air supplies and pressures. Therefore, it would be advantageous in the art to be able to describe a control means for molecular sieve on-board oxygen generators which will provide efficient OBOGS operation from limited air inlet supply and pressure.

SUMMARY OF THE INVENTION

It is an objective of the present invention to describe a control means for molecular sieve oxygen generating systems.

It is further an object of the present invention to describe a control means for molecular sieve oxygen generating systems which provides efficient system operation in airborne environments.

It is further an object of the present invention to describe a control means for molecular sieve oxygen generating systems which provides proper system operation from air inlet sources of limited supply and limited pressure, as is common in airborne applications.

The present invention measures both temperature and pressure of the inlet air of an oxygen generating system. An electronic control unit applies pressure limits to a pressure measurement signal and combines it with a temperature measurement signal to produce a composite analog signal responsive to both temperature and pressure inlet air conditions. This analog signal is linearly converted to a frequency signal, whereupon the frequency signal is divided by a constant in order to produce a drive signal for control of the adsorb/vent bed cycle valves. Composition control is achieved by venting product mixture as required. Inlet air pressures down to 5 PSIG produce correct system operation, and the quantity of conditioned air required is automatically limited so that system efficiency is higher than prior art systems.

Therefore, according to the present invention, a control means for molecular sieve on-board oxygen generators is presented which provides an improvement in system efficiency and which provides for proper system operation with air inlet supplies of limited capacity and limited pressure.

BRIEF DESCRIPTION OF THE DRAWINGS

The novel features believed characteristic of the invention are set forth in the appended claims. The invention itself, however, as well as a preferred mode of use, and further objects and advantages thereof, will best be understood by reference to the following detailed description of an illustrative embodiment when read in conjunction with the accompanying drawing(s), wherein:

DESCRIPTION OF THE INVENTION

The present invention addresses two prior art problems encountered in applying on-board oxygen concentrators to aircraft, namely aircraft with limited air inlet supply capacity and pressure at some points in the performance envelope and aircraft with large performance sensitivity to subsystem inefficiencies. For example, during engine idle conditions low bleed air supply pressure is frequently encountered and this will cause difficulty with current OBOGS, i.e. on-board oxygen generating systems. As a second example, the power inefficiency of current oxygen generating systems represents an energy drain and therefore a performance penalty for high-performance aircraft.

The present invention describes a control means for molecular sieve on-board oxygen generating systems which provides increased system efficiency and allows operation from air inlet sources of limited capacity and pressure. Whereas prior art systems have performance limitations with air inlet pressures below about 20 PSIG, the present invention provides OBOGS system operation down to 5 PSIG. The present invention also automatically limits air usage for inlet air pressures above 18 PSIG, and provides variable absorbing bed cycle rates as a function of air inlet temperature and pressure.

The present invention is also intended to provide a suitable means for controlling the concentration of product oxygen within a specified requirement band or range. This is required for aircrew breathing mixtures. The present invention is further intended to accomplish all of the above over a wide range of air supply temperatures as encountered in aircraft usage.

Figure 2:
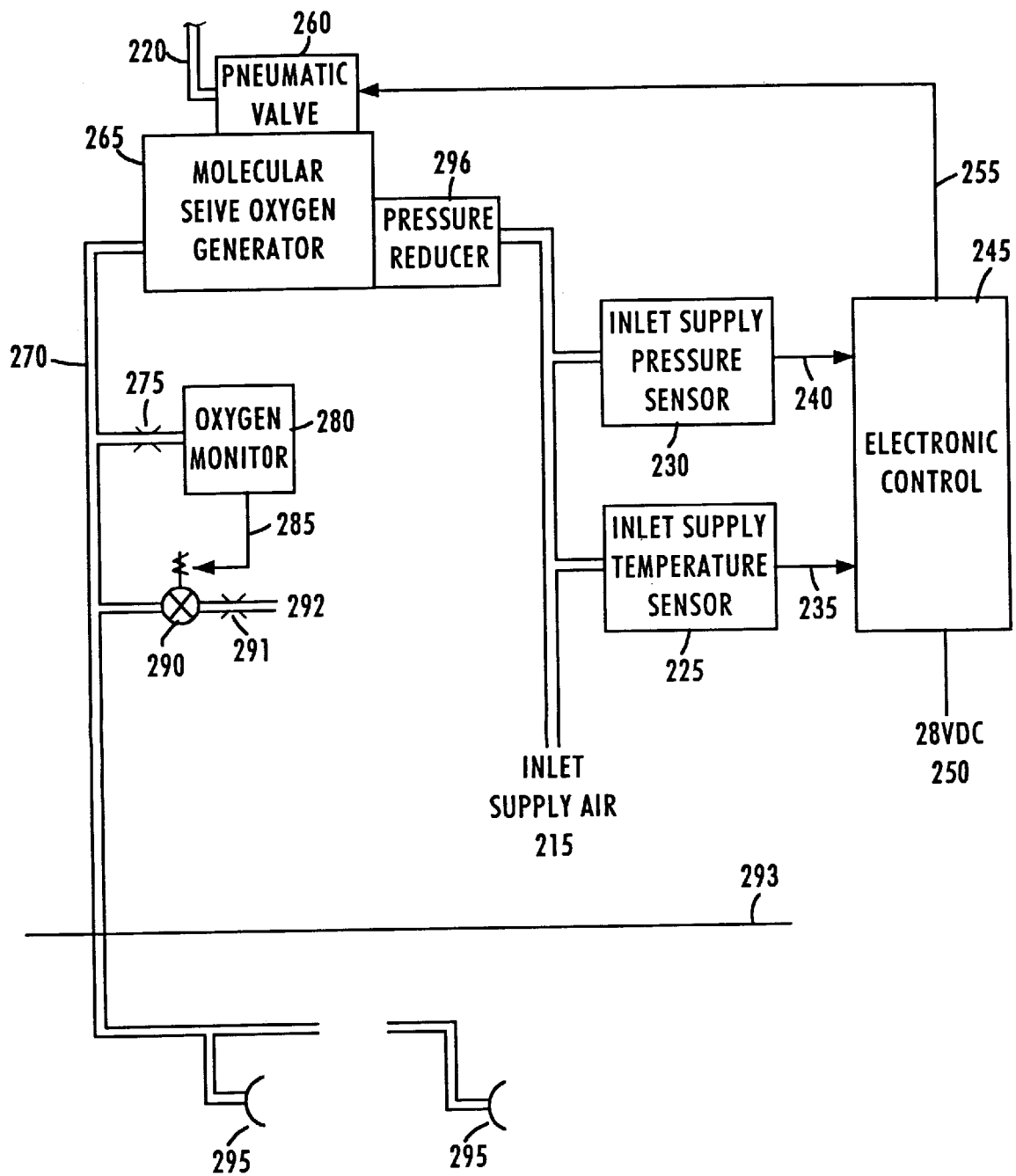
FIG. 2 is a Block Diagram of a Molecular Sieve Oxygen Generating System, according to a preferred embodiment of the present invention.

Referring to FIG. 2, an On-board Oxygen Generator 210 is composed of two major subassemblies, Electronic Control 245 and Molecular Sieve Oxygen Concentrator 265. Air at a nominal pressure range of approximately 5 to 250 PSIG is applied to Inlet Supply Air 215. Inlet Supply Distribution 220 routes Inlet Supply Air 215 to Inlet Supply Temperature Sensor 225, Inlet Supply Pressure Sensor 230 and Pressure Reducer 296. Pressure Reducer 296 supplies limited pressure air input to Molecular Sieve Oxygen Concentrator 265. Molecular Sieve Oxygen Concentrator 265 is a standard two bed concentrator. Inlet Supply Temperature Sensor 225 monitors the temperature of Inlet Supply Air 215, and supplies Temperature Sensor Electrical Signal 235 as an input signal to Electronic Control 245. Temperature Sensor Electrical Signal 235 is a digital signal with either proportional or fixed set point references. Inlet Supply Air 215 is also routed to Inlet Supply Pressure Sensor 230. Inlet Supply Pressure Sensor 230 generates Pressure Sensor Electrical Signal 240 which is also an input signal to Electronic Control 245. Pressure Sensor Electrical Signal 240 is proportional to gage pressure over a limited range, nominally 5 to 20 PSIG approximately, but is capable of withstanding high pressure extremes. Pressure Reducer 296 is set to control the maximum bed pressure of Molecular Sieve Oxygen Concentrator 265 to the lowest level consistent with minimum acceptable air usage at the maximum bed cycling rate. Temperature Sensor Electrical Signal 235 and Pressure Sensor Electrical Signal 240 are input signals to Electronic Control 245, as is Electrical Power Input 250 which may be typically 28 volts direct current (VDC) in aircraft applications. The output of Electronic Control 245 is Electronic Control Output Signal 255, which controls Solenoid Operated Pneumatic Valve 260 on Molecular Sieve Oxygen Concentrator 265.

The product gas output of Molecular Sieve Oxygen Concentrator 265 is routed to the aircrew by Oxygen Concentrator Output Distribution 270. Aircrew distribution points are shown by Aircrew Delivery Point(s) 295. The aircrew are normally in a pressurized cabin, and the division between pressurized and unpressurized areas is shown as Pressurization Demarcation Line 293. Oxygen Concentrator Output Distribution 270 also routes the product gas output of Molecular Sieve Oxygen Concentrator 265 to Oxygen Monitor 280 which generates Oxygen Monitor Output Signal 285. Oxygen Monitor 280 is utilized to determine the extent of oxygen enrichment present at Oxygen Concentrator Output Distribution 270 by measurement of a product sample present at the output of First Restrictive Orifice 275. Either separately or integrally to Oxygen Monitor 280, Solenoid Operated Vent Valve 290 is pneumatically connected to Oxygen Concentrator Output Distribution 270 and electrically connected via Oxygen Monitor Output Signal 285 to Oxygen Monitor 280.

Molecular Sieve Oxygen Concentrator 265 operates in the standard pressure swing manner. Molecular Sieve Oxygen Concentrator 265 contains two or more beds, not shown here. Air is alternately supplied at pressure to each bed with the other (desorbing) bed connected to First Atmospheric Vent 220 by the positioning of Solenoid Operated Pneumatic Valve 260. The internal positioning of Solenoid Operated Pneumatic Valve 260 determines which bed of Molecular Sieve Oxygen Concentrator 265 is connected to First Atmospheric Vent 220, with internal positioning of Solenoid Operated Pneumatic Valve 260 being controlled by Electronic Control 245 via Electronic Control Output Signal 255. The desorbing bed is also provided with a purge flow of oxygen enriched product gas (not shown) to assist desorption. Electronic Control 245 controls the bed cycling rate of Molecular Sieve Oxygen Concentrator 265 in response to both Inlet Supply Air 215 pressure and temperature. Preferably the bed cycling rate will be controlled proportionally to pressure, with an extreme temperature override switching function. Alternatively a cycle rate which is fixed at finite points rather than proportional can be used, offering simplicity at the expense of some accuracy.

Figure 3:
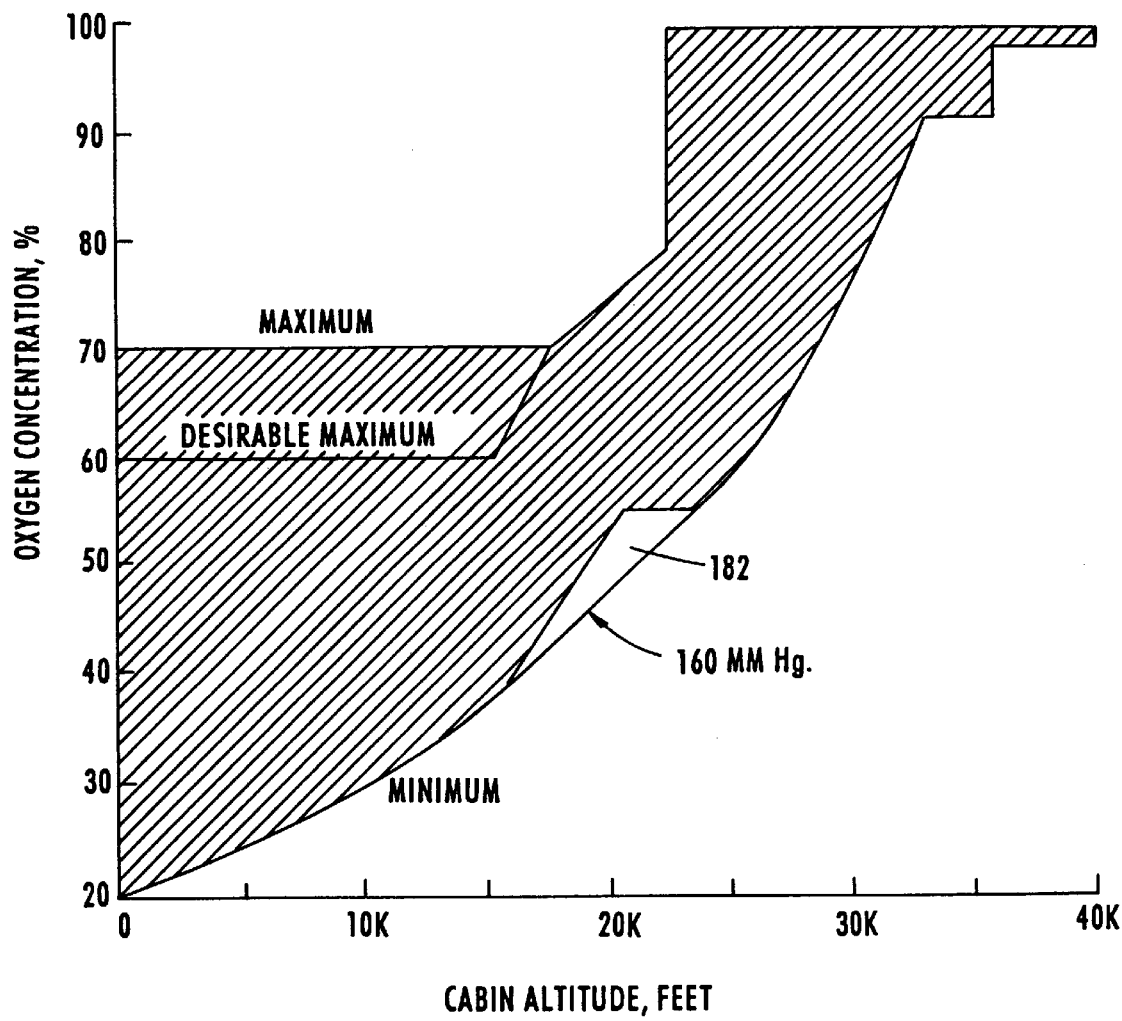
FIG. 3 is a graph depicting Limits to Oxygen Concentration as a Function of Cabin Altitude.

Product gas delivered by Oxygen Concentrator Output Distribution 270 to Aircrew Delivery Point(s) 295 is continuously monitored by Oxygen Monitor 280 which also senses cabin pressure and generates Oxygen Monitor Output Signal 285, which switches Solenoid Operated Vent Valve 290 for connectivity with Second Atmospheric Vent 292 as required. Second Restrictive Orifice 291 is fixed to that value which, at maximum desired pressure in Oxygen Concentrator Output Distribution 270, will reduce the oxygen enrichment present in Oxygen Concentrator Output Distribution 270 to at least the upper limit of the specified concentration curve (Refer to FIG. 3, discussed below) even with very low aircrew breathing demand. A second switch point, well above the lower allowable limit, closes Solenoid Operated Vent Valve 290 to assure physiologically safe product concentration delivery to Aircrew Delivery Point(s) 295. FIG. 3 presents a graph of maximum and minimum allowable concentrations of oxygen as a function of aircraft cabin altitude, in order to illustrate the varying oxygen pressure requirements of an OBOGS aircraft system.

Figure 4:
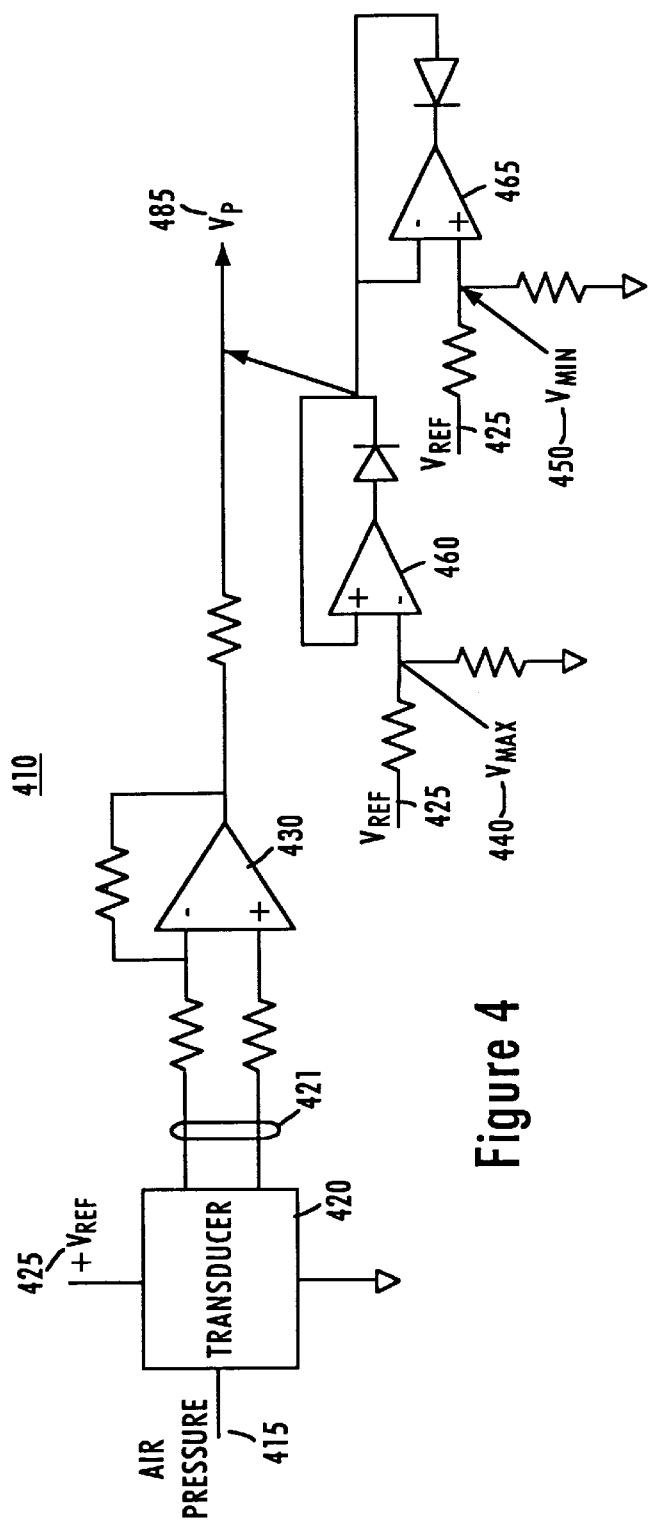
FIGS. 4 and 4A are an Electrical Schematic of the First Portion of a Molecular Sieve Oxygen Generating System Electronic Control Unit, according to the preferred embodiment of the present invention.
Figure 4A:
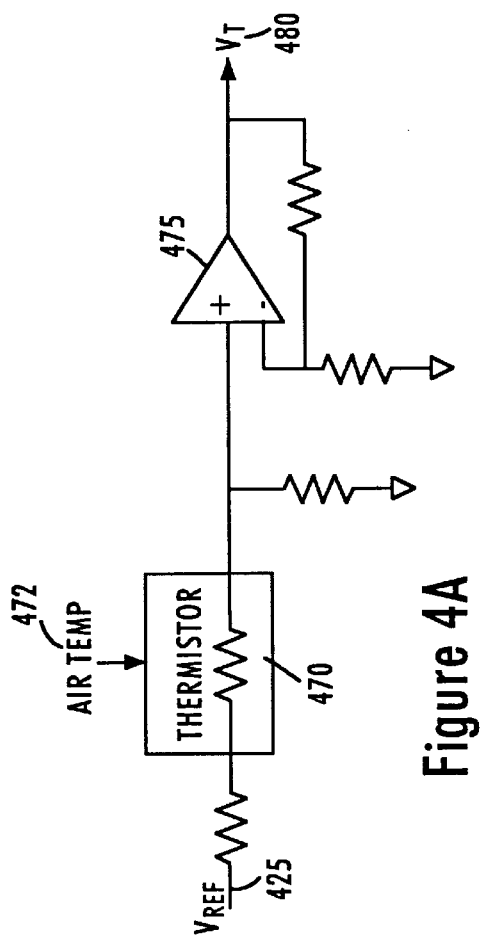
Figure 5:
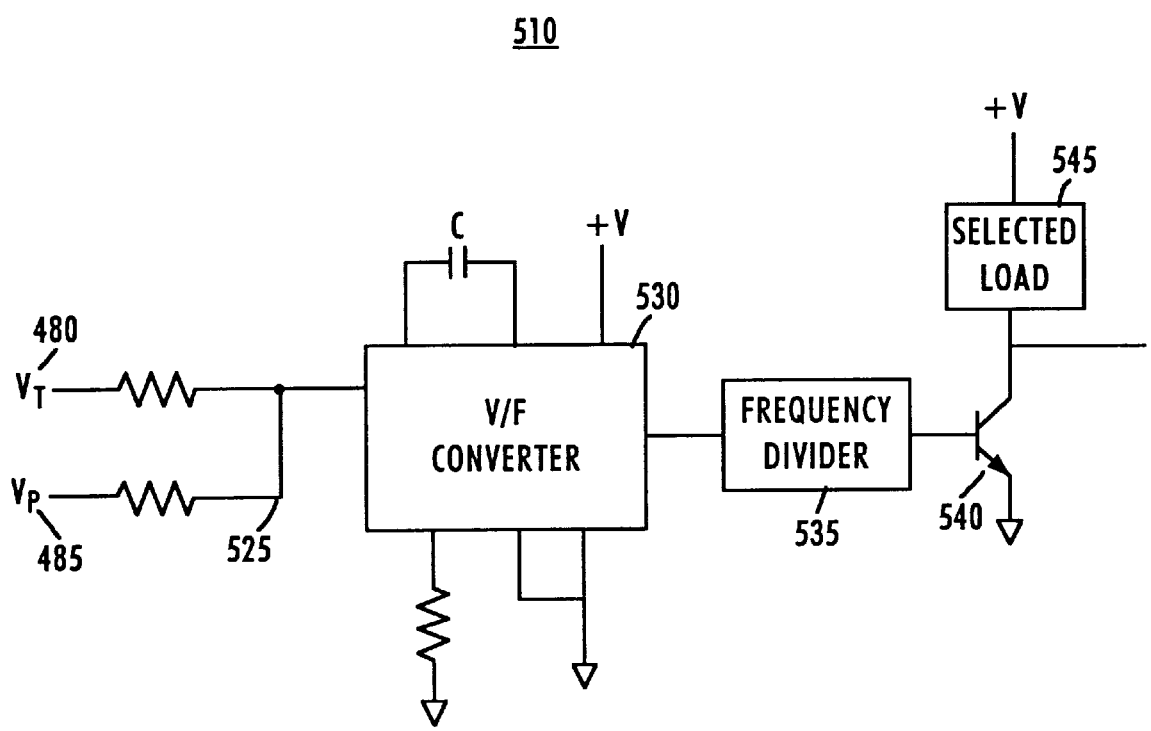
FIG. 5 is an Electrical Schematic of the Second Portion of a Molecular Sieve Oxygen Generating System Electronic Control Unit, according to the preferred embodiment of the present invention.

Electronic Control 245 is presented in more detail in FIG. 4 and FIG. 5. Referring to FIG. 4, Air Pressure Input 415 is the Inlet Air Supply 215 of FIG. 2. Air Pressure Transducer 420 is an embodiment of Inlet Supply Pressure Sensor 230 of FIG. 2. Temperature Thermistor 470 is an embodiment of Inlet Supply Temperature Sensor 225 of FIG. 2. Reference Voltage 425 represents a stable direct current (DC) voltage utilized as a fixed reference value for circuit operations. The pressure of Air Pressure Input 415 is translated by Air Pressure Transducer 420 to an electrical signal Pressure Transducer Output Signal 421. Pressure Transducer Output Signal 421 is routed to the input of First Signal Amplifier 430. The output of First Signal Amplifier 430 is combined with the outputs of First Nonlinear Amplifier 460 and Second Nonlinear Amplifier 465 in a manner discussed below. Maximum Pressure Reference Voltage 440 is generated from Reference Voltage 425 and is utilized as a maximum pressure limit reference voltage for First Nonlinear Amplifier 460. Minimum Pressure Reference Voltage 450 is generated from Reference Voltage 425 and is utilized as a minimum pressure limit reference voltage for Second Nonlinear Amplifier 465. First Nonlinear Amplifier 460 and Second Nonlinear Amplifier 465 serve to limit the voltage excursions of Pressure Analog Output 485 to a range representative of the lowest and highest pressures desired in the OBOGS system output. Within the pressure range between these limits, the value of Pressure Analog Output 485 is as determined by the output of First Signal Amplifier 430. Pressure Analog Output 485 is thus a range of voltage limited to maximum and minimum values related to maximum and minimum pressures at Air Pressure Input 415, while being continuously variable within the range. Air Temperature Input 472 is the temperature of Inlet Air Supply 215 of FIG. 2. Temperature Thermistor 470, a transducer element, produces an electrical signal which is representative of this temperature. The output of Temperature Thermistor 470 is routed to Second Signal Amplifier 475. Second Signal Amplifier 475 outputs a signal linearly related to temperature at Temperature Analog Output 480.

Referring to FIG. 5, Temperature Analog Output 480 and Pressure Analog Output 485 drive the circuitry 510 of FIG. 5. Temperature Analog Input 480 and Pressure Analog Input 485 are summed together to form Analog Sum signal 525. Analog Sum 525 is routed to Voltage-to-Frequency Converter 530. The output signal of Voltage-to-Frequency Converter 530 is a frequency which is linearly related to the value of Analog Sum 525. The output signal of Voltage-to-Frequency Converter 530 is applied to the input of Frequency Divider 535. Frequency Divider 535 serves to divide the frequency output of Voltage-to-Frequency Converter 530 by a fixed amount. The fixed divide ratio of Frequency Divider 535 is chosen such that the on and off time intervals at the output of Frequency Divider 535 allow the desired system transient response. The output of Frequency Divider 535 is applied to Switch 540. The output of Switched Load 545 controls the operation of Solenoid Operated Pneumatic Valve 260 in FIG. 2.

Figure 6:
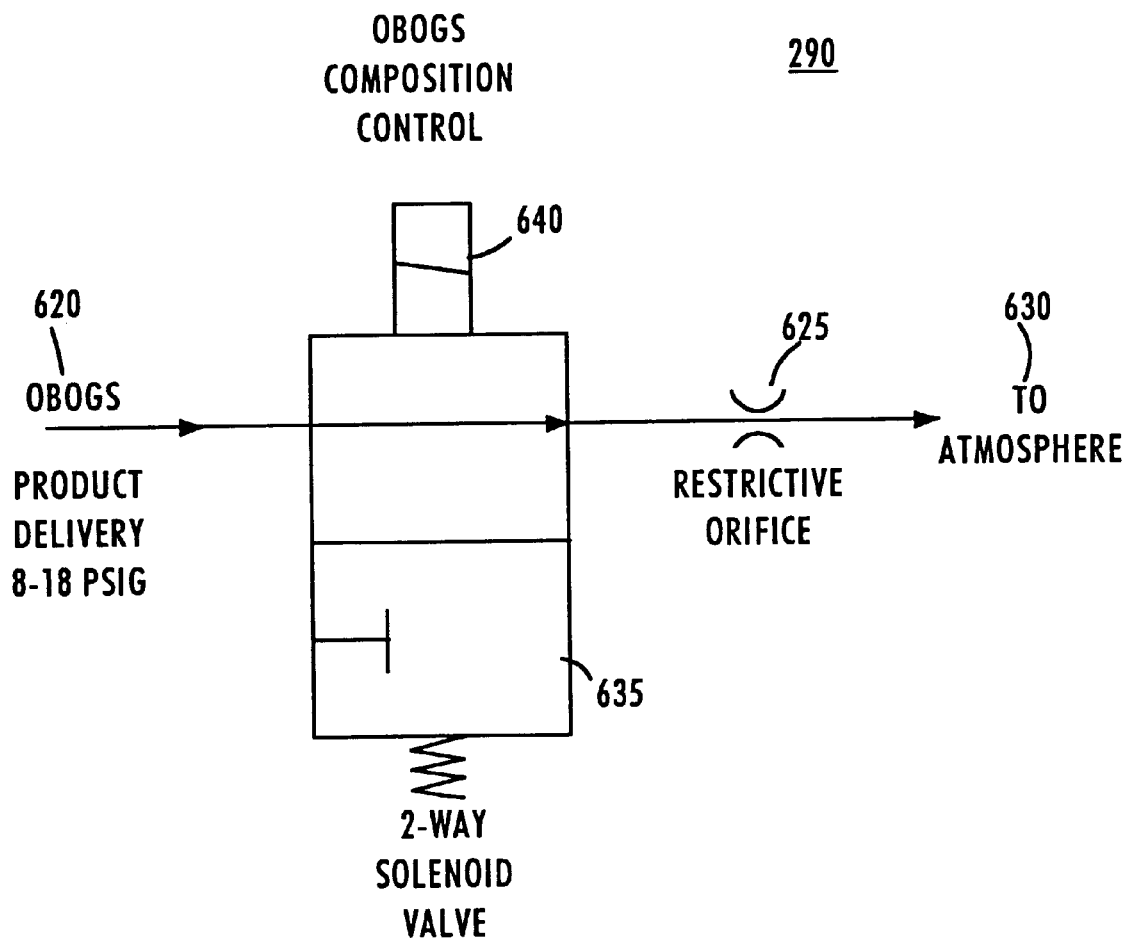
FIG. 6 is a Mechanical Drawing of a Solenoid Operated Vent Valve utilized in the Molecular Sieve Oxygen Generating System, according to the preferred embodiment of the present invention.

Solenoid Operated Vent Valve 290 in FIG. 2 is presented in more detail in FIG. 6. Solenoid Operated Vent Valve 290 is composed of Valve Assembly 635 and Restrictive Orifice 625. Product Delivery Input 620 represents a connection to Oxygen Concentrator Output Distribution 270 of FIG. 2. Restrictive Orifice 625 is analogous to Second Restrictive Orifice 291 of FIG. 2. Atmosphere Vent 630 is analogous to Second Atmospheric Vent 292 of FIG. 2. Electrical Solenoid 640 represents an electrical control from Oxygen Monitor Output Signal 285 of FIG. 2.

The control of gaseous venting by Solenoid Operated Vent Valve 290 is on-off in nature, and is controlled by the signal at Electrical Solenoid 640. This signal is proportional to oxygen partial pressure. When the oxygen partial pressure is greater than approximately 240 mm Hg (Mercury). Valve Assembly 635 will open and deliver full pressure from Product Delivery Input 620 to Atmosphere Vent 630 through Restrictive Orifice 625. This bleeds off product flow at a high rate which will cause sufficient nitrogen breakthrough in the concentrator beds to reduce the product oxygen concentration. At the lower switch point, approximately 220 mm Hg., the control signal to Electrical Solenoid 640 causes Solenoid Operated Vent Valve 290 to close, thereby allowing oxygen concentration to increase.

Figure 7:
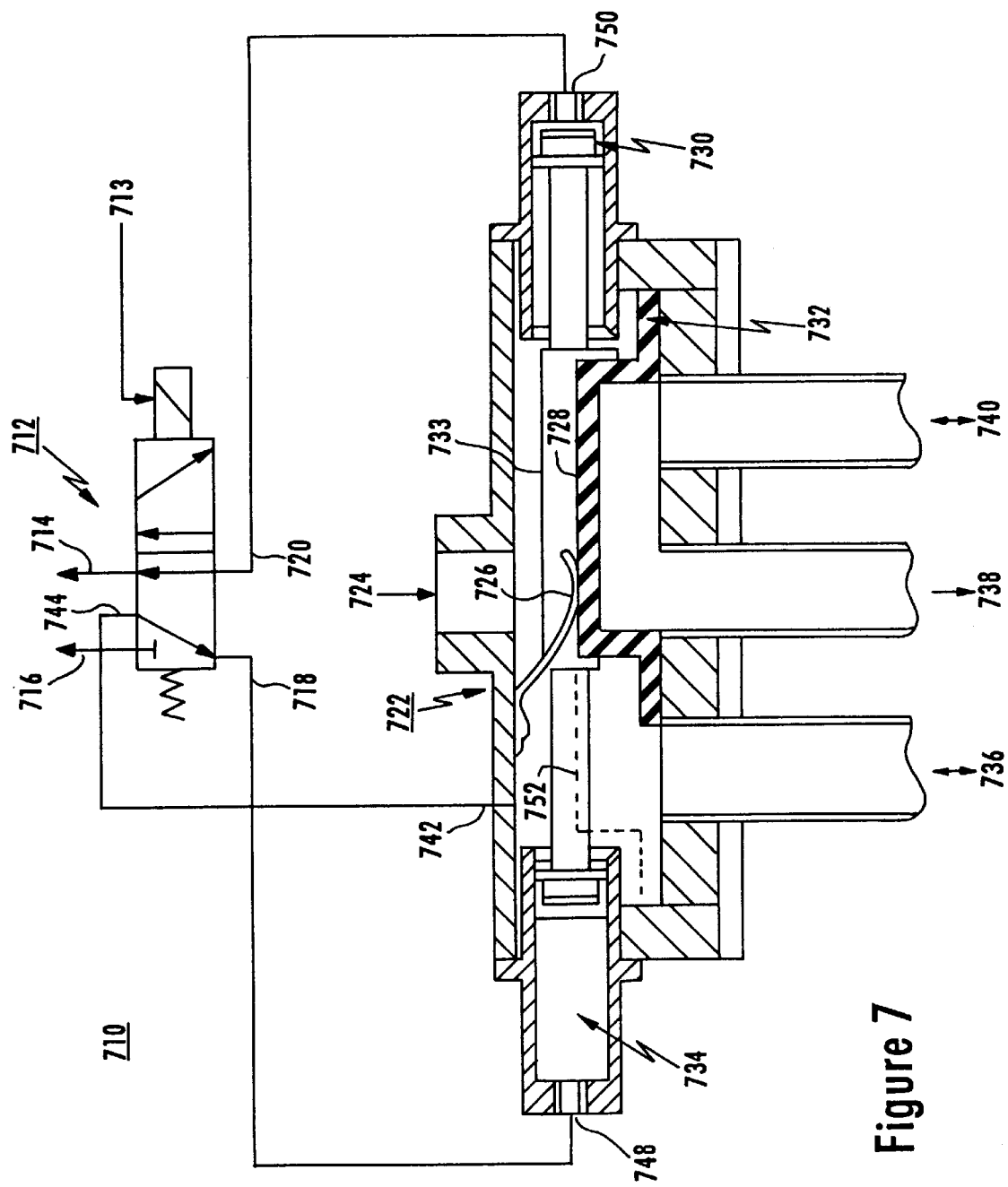
FIG. 7 is a Mechanical Drawing of a Solenoid Operated Pneumatic Linear Valve utilized in the Molecular Sieve Oxygen Generating System, according to the preferred embodiment of the present invention.

The details for one example of an apparatus that implements Solenoid Operated Pneumatic Valve 260 are presented in the linear valve mechanical illustration of FIG. 7. Valve System 710 is composed of Solenoid 712 and Linear Valve Assembly 722. Solenoid 712 is a control element which provides control of Linear Valve Assembly 722. Solenoid 712 is a "4-way solenoid" of the type known in the art and is utilized in this preferred embodiment to illustrate a method of linear valve control; other control means, solenoid or otherwise, may be used without departing from the spirit and scope of the invention. Linear Valve Assembly 722 has the following elements: System Air Inlet 724, Leaf Spring 726, Poppet 728, First Piston 730, Second Piston 734, Second Bed Connection 736, Bed Vent Connection 738, First Bed Connection 740, Air Inlet Sample Port 742, Second Piston Connection 748 and First Piston Connection 750. Solenoid 712 has the following elements: First Valve Vent 714, Second Valve Vent 716, Valve Connection 718, Valve Connection 720 and Common Connection 744. Electrical signal 713 is used to control Solenoid 712 in the usual manner. System Air Inlet 724 is connected to the system air supply. System air is supplied to the internal chamber of Linear Valve Assembly 722 by System Air Inlet 724. Leaf Spring 726 is used to hold Poppet 728 against Poppet Contact Surface 732. Poppet 728 is free to slide along Poppet Contact Surface 732, as indicated by the dashed lines of Poppet Alternate Position 752. Second Piston 734 and First Piston 730 are connected to opposing ends of Poppet 728 by a solid member 733 internal to Linear Valve Assembly 722.

Second Piston Connection 748 is connected to Connection 718 of Solenoid 712. Air Inlet Sample Port 742 is connected to Common Connection 744 of Solenoid 712. First Piston Connection 750 is connected to Valve Connection 720 of Solenoid 712, and Second Valve Vent 716 and First Valve Vent 714 are connected to system vents (not shown). When in the position shown, Second Piston 734 will receive pressurized air from Air Inlet Sample Port 742 via Common Connection 744, Valve Connection 718 and Second Piston Connection 748. As shown, First Piston 730 is vented to Valve Vent 714 via Valve Connection 720 and First Piston Connection 750. This causes Poppet 728 to move toward the First Piston 730 end, as shown by the dark poppet shading. When Solenoid 712 is placed in the opposite state by Electrical signal 713, Valve Connection 718 is connected to Second Valve Vent 716, Common Connection 744 is connected to Valve Connection 720, and First Valve Vent 714 is disconnected from Valve Connection 720. This allows Second Piston 734 to vent to Second Valve Vent 716 via Valve Connection 718 and Second Piston Connection 748, and First Piston 730 to receive pressurized system air from System Air Inlet 724 via Air Inlet Sample Port 742 and Common Connection 744. First Valve Vent 714 is not connected internal to Solenoid 712.

When the pressure differential across First Piston 730 is varied by varying Electrical signal 713 from a first state to a second state or vice versa, Poppet 728 will slide from its current position along Poppet Contact Surface 732 to Poppet Alternate Position 752. Thus a pressure differential across First Piston 730 will cause Poppet 728 to move from First Piston Connection 750 to Second Piston Connection 748. As Poppet 728 slides along Poppet Contact Surface 732 as described, Bed Vent Connection 738 is connected to First Bed Connection 740 or to Second Bed Connection 736 through the trapped gas volume existing between Poppet 728 and Poppet Contact Surface 732.

Figure 1:
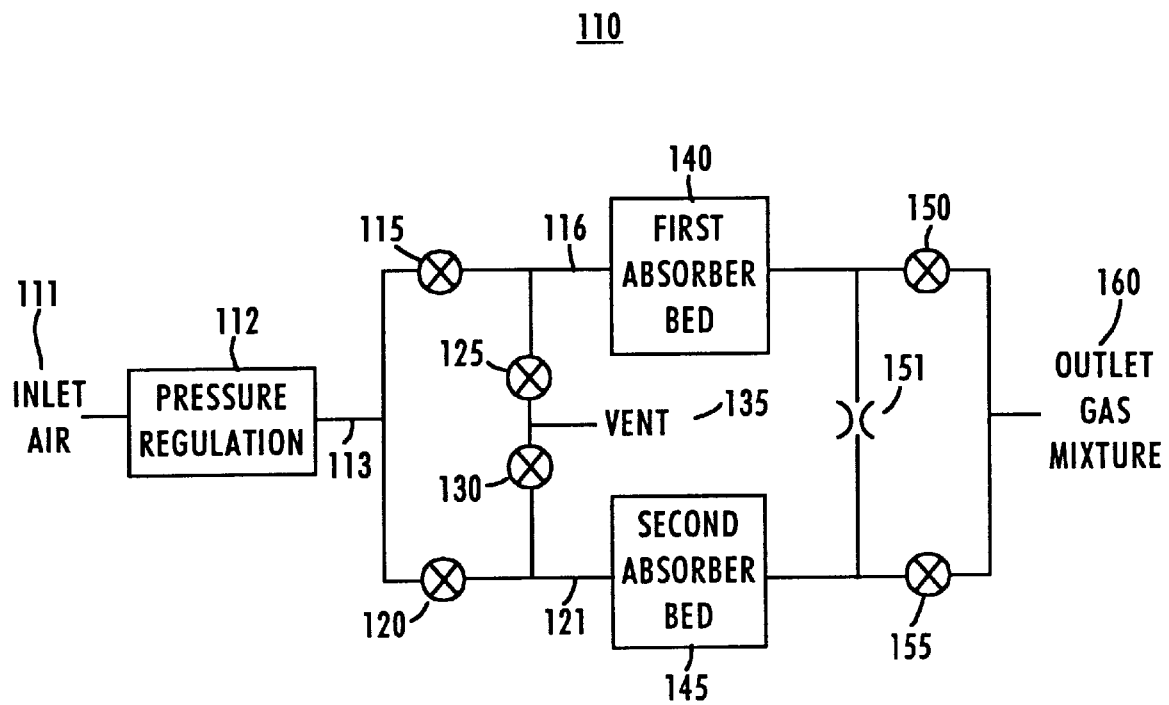
FIG. 1 is a Block Diagram of a Molecular Sieve Oxygen Generating System, according to the prior art.

Bed Vent Connection 738 is connected to a system vent. First Bed Connection 740 is connected to an air purification system bed (not shown), and Second Bed Connection 736 is connected to another air purification system bed (not shown). A first position of Poppet 728 is depicted by the dark shading in FIG. 1, and the second, opposing position of Poppet 728 is shown by the dashed lines of Poppet Alternate Position 752. As Electrical signal 713 varies, Solenoid 12 causes the linear valve internal pistons 730 and 734 to be set to either fixed end position. Therefore, the valve cycle rate of linear valve system 10 is simply controlled as a function of varying Electrical signal 713.

With Poppet 728 in the position shown in FIG. 7, connectivity is achieved between First Bed Connection 740 and Bed Vent connection 738. Both sides of Second Piston 734 are connected to System Air Inlet 724 and there is no pressure differential across Second Piston 734. One side of First Piston 730, however, is connected internally to System Air Inlet 724 and the opposite side of the piston is connected to First Piston Connection 750. First Piston Connection 750 in turn is connected to First Valve Vent 714 so that the pressure differential across First Piston 730 is the difference in pressure between System Air Inlet 724 and First Valve Vent 714.

Alternately, when the internal connections of Solenoid 712 are reversed as described previously, there is a pressure differential across Second Piston 734 and no pressure differential across First Piston 730 with the result that Poppet 728 slides along Poppet Contact Surface 32, towards Second Piston 734, to Poppet Alternate Position 752. As Poppet 728 moves to Poppet Alternate Position 752 connectivity is achieved between Second Bed Connection 736 and Bed Vent Connection 738. Connectivity, however, is never present between Second Bed Connection 736 and First Bed Connection 740. This is due to the fact that Poppet 728 is made of a self-lubricating material, such as plastic, which is machined and lapped to a high degree of flatness and finish, and Poppet Contact Surface 732 is also produced with a high degree of flatness and finish. Additionally, Leaf Spring 726 enforces the contact made between Poppet 728 and Poppet Contact Surface 732.

The valve system disclosed in FIG. 7 offers significant advantages over prior art valves. First, prior art valve applications, such as air purification systems, typically use rotary valves having gear motors. Such valves are expensive because of the gear motor apparatus, and typical prior art air purification systems may require a significant number of rotary valves. The valve system of FIG. 7 does not use gear motors for operation, and thus is more economical. Second, the valve cycle rate is easily controllable. This is in contrast to prior art valves which utilize gear motors and thus have a valve cycle rate determined by the RPM characteristics of the gear motor. This places an undesirable restriction on gas flow system design. The present invention describes a valve which does not employ a gear motor for operation. Thus the valve of the present invention has a controllable variable cycle rate which is not related to the RPM characteristics of a gear motor. Additionally, because the linear valve does not use gear motors, it is much cheaper to manufacture and maintain.

Figure 8:
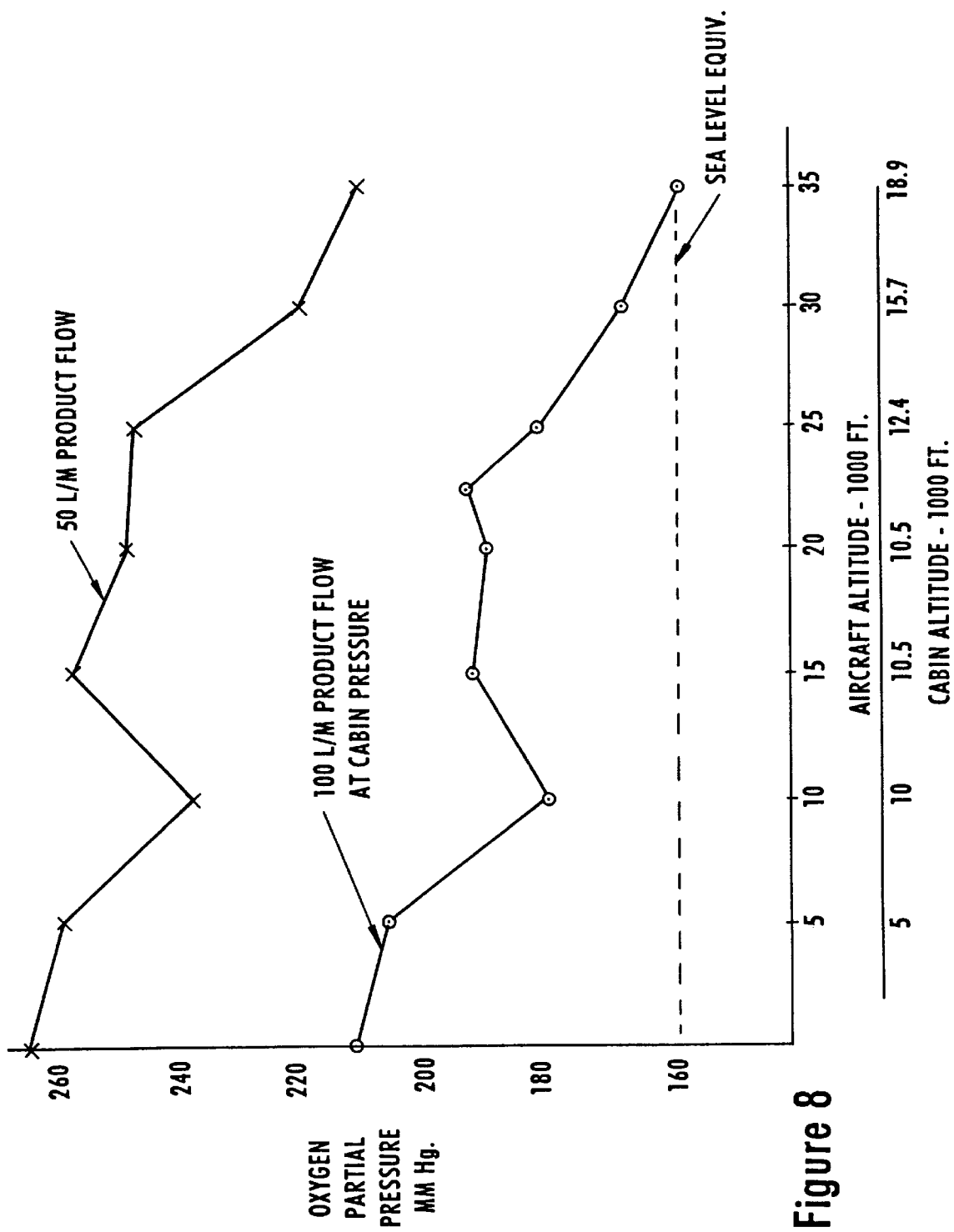
FIG. 8 is a Graph depicting Oxygen Partial Pressure versus Aircraft and Crew Altitude of an Experimental Molecular Sieve Oxygen Generating System, according to the preferred embodiment of the present invention.

FIG. 8 depicts test results of a developmental OBOGS system constructed in accordance with the foregoing description of the present invention. From this data it can be seen that the oxygen partial pressure is maintained within the required range at all altitudes at the projected minimum inlet pressure (idle power) settings, and air usage is limited to approximately 1.0 lb. per minute at all conditions. Determination of the control means of the present invention was based on this and related test data which clearly showed system advantages in response time and accuracy over prior art system approaches.

A basic feature of the present invention is that adsorbing bed cycling rate varies as a function of the supplied air gage pressure, from about 10 seconds/cycle at 18 PSIG to 5 seconds/cycle at 5 PSIG, and this automatically limits air usage while optimizing performance. These two seemingly contradictory functions occur because of four factors. First, the bed geometry is designed for a minimum "dead" volume (volume in excess of sieve) which is pressurized and then lost during desorption each cycle. The higher the pressure, the more volume that is lost. Second, purge cross flow is precisely sized at the highest controlled operating pressure, 18 PSIG in this case, to meet all requirements with minimum purge flow. Third, the control valve is designed for rapid movement to full opening and minimum pressure drop, thereby allowing rapid cycling. Four, a type of molecular sieve best suited for rapid pressure swing adsorption is used. 18 PSIG is the upper limit setting, and higher pressures do not reduce the absorbing bed cycling rate below 10 seconds/cycle.

Another feature of the present invention is that the electrical signal from the temperature sensor also varies cycling rate as a function of the temperature of the air supplied, over a range of approximately +10/−20% at 140 degrees Fahrenheit to approximately +10/−20% at −20 degrees Fahrenheit. This improves operation at both temperature extremes without exceeding air usage goals, since bed adsorption is a function of temperature and the oxygen output will follow the same trend. Yet another feature of the present invention is that the composition control can be of the bang—bang type in order to maintain oxygen at the 60% level.

It can be seen from the above discussion that the present invention provides a control means for molecular sieve on-board oxygen generating systems which provides increased efficiencies while providing operation from inlet supply sources having limited supply and pressure capability.

While the invention has been particularly shown and described with reference to a preferred embodiment, it will be understood by those skilled in the art that various changes in form and detail may be made therein without departing from the spirit and scope of the invention. For instance, while the OBOGS is directed to generating oxygen, other gases or gaseous mixtures may be generated by the gas generating system of the present invention.

It is claimed:

1. An apparatus for supplying a breathable gas mixture to aircraft crew members from an air source, comprising:

first and second adsorption beds, each bed having an inlet for admitting a gas mixture and an outlet for discharging product gas;

a valve assembly for selectively admitting the gas mixture to one of said inlet of said first and second beds and for selectively exhausting the discharged product gas from one of said beds through said outlet of said first and second beds;

a pressure reducer for supplying the gas mixture at a pressure between 5 psig and 18 psig to said valve assembly;

an inlet supply pressure sensor in fluid communication with said valve assembly for sensing the pressure of the gas mixture supplied thereto and for providing a signal indicator thereof;

an inlet supply temperature sensor in fluid communication with said valve assembly for sensing the temperature of the gas mixture supplied thereto and for providing a signal indicative thereof;

a controller which receives said pressure signal and said temperature signal and based upon said pressure and temperature signals determines intervals for adsorption by said first and second beds and for actuating said valve assembly for cycling said first and second beds between operating conditions where the gas mixture has been admitted to one of said first and second beds and is being adsorbed and regenerating conditions where the discharged product gas is being exhausted, to optimize the production of product gas for the sensed inlet air conditions.

2. The apparatus of claim 1, further comprising an oxygen monitor in fluid communication with said valve for measuring the oxygen content of the discharging gas and producing a signal indicative of the oxygen content for cycling said first and second beds between operating and regenerating conditions to optimize the production of product gas for the sensed inlet air conditions.

3. The apparatus of claim 2, further comprising an electrically operated vent valve in fluid communication with the discharging gas.

4. The apparatus of claim 3, wherein when the oxygen content of the discharging gas reaches a predetermined level, said oxygen monitor sends a signal to said vent valve causing said vent valve to open thereby discharging a portion of said discharging gas to flow to atmosphere and reduce the oxygen content of the discharging gas.

5. The apparatus of claim 1, wherein said valve assembly includes a control valve and a linear valve assembly.

6. The apparatus of claim 5, wherein said control valve receives a signal from said controller.

7. The apparatus of claim 5, wherein said control valve is a 4-way solenoid valve.

8. The apparatus of claim 7, wherein said linear valve assembly includes:

a body including a valve chamber, an inlet to said chamber for admitting said gas mixture, a connection to said first bed, a connection to said second bed, and a vent connection;

a slide valve in the chamber movable between two positions in which it serves to communicate either of said first and second bed connections to said vent connection while the other of said first and second bed connections is in communication to said inlet;

said body including a first cylinder and a second cylinder;

a piston in each cylinder, the first of said pistons movable in a first direction and the second of said pistons movable in a second direction;

said 4-way solenoid valve directing pressure to one of said pistons to actuate said one piston and move said slide valve to one of said two positions.

9. The apparatus of claim 8, wherein said first and second pistons are of equal size.

10. The apparatus of claim 8, wherein said valve body has a flat contact surface and said poppet moves along said surface.

11. The apparatus of claim 8, wherein said linear valve assembly further comprises a spring element which holds a poppet against a contact surface.

12. The apparatus of claim 11, wherein the poppet is made of a self-lubricating material.

13. The apparatus of claim 12, wherein the self-lubricating material is plastic.

14. The apparatus of claim 1, wherein the first and second beds contain a molecular sieve.

15. The apparatus of claim 1, wherein said controller comprises:

a first transducer element supplied with an air pressure signal from said inlet supply pressure sensor and a reference signal, wherein the first transducer element generates an electrical pressure signal from said air pressure signal, generates a maximum pressure signal from the reference signal and generates a minimum pressure signal from the reference signal;

a first amplifier element which is supplied the electrical pressure signal produced by the first transducer element and which generates an output signal, wherein the maximum pressure signal, the minimum pressure signal and the output signal of the first amplifier element determine a pressure voltage signal;

a second transducer element supplied with an air temperature signal of the air supply and the reference signal, wherein the second transducer element translates the air temperature signal to an electrical temperature signal;

a second amplifier element which is supplied the electrical temperature signal produced by the second transducer element and which generates a temperature voltage signal;

a converter element which receives a sum voltage signal formed by summing together the pressure voltage signal and the temperature voltage signal and which converts the sum voltage signal to a sum frequency signal which is linearly related to the sum voltage signal;

a divided element which divides the sum frequency signal by a predetermined amount to produce a divided sum frequency signal;

a switch element which receives the divided sum frequency signal; and a load element coupled to the switch element, wherein an output signal of the load element controls the means for supplying the air supply at a reduced pressure to the gas concentrator element.

16. The apparatus of claim 15, wherein the reference signal is a voltage reference signal.

17. The apparatus of claim 15, wherein the temperature voltage signal is linearly related to the air temperature signal of the air supply and the pressure voltage signal is linearly related to the air pressure signal of the air supply.

18. The apparatus of claim 1, wherein said valve cycles between 5 secs/cycle at 5 psig to 10 cycles/sec at 18 psig.

19. The apparatus of claim 1, wherein said first and second beds are sized to produce 1 lb./min. flow at 5 psig pressure being supplied to said valve assembly.

20. The apparatus for supplying a breathable gas mixture to aircraft crew members from an air source, comprising:

first and second adsorption beds, each bed having an inlet for admitting a gas mixture and an outlet for discharging gas;

a valve assembly for selectively admitting the gas mixture to one of said inlet of said first and second beds and for selectively exhausting the discharged gas from one of said beds through said outlet of said first and second beds;

a pressure reducer for supplying the gas mixture at a pressure between 5 psig and 18 psig to said valve assembly;

an inlet supply pressure sensor in fluid communication with said valve assembly for sensing the pressure of the gas mixture supplied thereto and for providing a signal indicator thereof;

an inlet supply temperature sensor in fluid communication with said valve assembly for sensing the temperature of the gas mixture supplied thereto and for providing a signal indicative thereof;

a controller which receives said pressure signal and said temperature signal and based upon only said pressure and temperature signals determines intervals for adsorption by said first and second beds and for actuating said valve assembly for cycling said first and second beds between operating conditions where the gas mixture has been admitted to one of said first and second beds and is being adsorbed and regenerating conditions where the discharged product gas is being exhausted, to optimize the production of product gas for the sensed inlet air conditions.

21. The apparatus of claim 20, wherein said first and second beds are sized to produce 1 lb./min. flow at 5 psig pressure being supplied to said valve assembly.

* * * * *